3,488,332
PROCESS FOR PREPARATION OF LIVING POLYMER
Michio Hiraoka, Tokyo-to, Takenobu Takase, Koganei-shi, Tokyo-to, and Yasukuni Kobayashi, Tokyo-to, Japan, assignors to Nippon Soda Kabushiki Kaisha, Tokyo-to, Japan, a company of Japan
No Drawing. Filed Mar. 23, 1965, Ser. No. 442,188
Claims priority, application Japan, Mar. 25, 1964, 39/16,172; Dec. 21, 1964, 39/71,814
Int. Cl. C08f 1/68, 7/04; C08d 1/20
U.S. Cl. 260—83.7  12 Claims

ABSTRACT OF THE DISCLOSURE

A process for preparing living polymers which comprises reacting a monomer of the formula

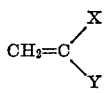

wherein X is selected from the group consisting of hydrogen and organic substituents, and Y is an organic substituent, and wherein the sum of Hammett's substituent constant of X and Y is in the range of from about −0.2 to 0.1 and selected from aliphatic unsaturated hydrocarbons having conjugated double bonds and aryl-substituted vinyl or vinylidene compounds, with a mixture of alkali metal of small particles having an average diameter of less than about 20μ and a maximum diameter up to about 50μ, and an activator in an amount stoichiometrically less than the amount of said alkali metal and a Lewis type base at a temperature in the range of from −100° C. to 30° C., the reaction being so conducted that in an initiation stage the addition of monomer to said mixture is performed slowly by keeping the rate of addition so low, until alkali metal has been completely consumed, that the propagation reaction of the living polymer chain hardly proceeds. The invention also comprises preparation of living copolymers; furthermore, the production of homopolymers and copolymers, respectively, by addition to said living polymers' termination agents for arresting further reaction.

---

This invention relates to an improved process for the preparation of living polymers.

The process of the invention is characterized in the initial stage of polymerization, in which alkali metal added to the reaction medium is reacted completely with monomer in the presence of less than the stoichiometric amount of the activator to produce lower polymeric anion as the seed, and it is not necessary to previously prepare and employ a solution of initiation catalyst consisting of only alkali metal-activator complex and solvent.

The first object of this invention is to provide an industrial method of preparing the living polymer economically by simplifying the initial stage.

The second object of this invention is to provide a process for the preparation of the living polymer wherein a defined degree of polymerization may be controlled by regulation only of the amount of the added monomer with respect to the amount of the added alkali metal.

The polymerization of a conjugated diene hydrocarbon, such as styrene, isoprene and butadiene, by the catalytic action of an aromatic hydrocarbon-alkali metal complex which is prepared by the reaction of a polynuclear aromatic hydrocarbon, such as naphthalene and biphenyl, with an alkali metal, in the presence of special ethers, such as tetrahydrofuran and 1, 2-dimethoxyethane, is known as a so-called living polymer synthesis.

It is also known that the living polymer has the following characteristic chemical properties: termination does not occur substantially in the polymerization reaction, and the activity at each end of the polymer molecule is maintained. Consequently, the average degree of polymerization is expressed as a function of the molar ratio of the used monomer to the alkali metal-aromatic hydrocarbon complex. The polymers prepared in this way have narrower distribution of molecular weight than in the case of polymers prepared by other known methods. Functional groups can be introduced at each end of the polymeric chain by treatment of the resulting polymer solution with electrophilic reagents and block copolymers can be formed easily by the addition of another monomer to resulting polymer solution.

However, in the case of synthesis of such living polymers, it is necessary to first prepare the solution of the aromatic hydrocarbon-alkali metal complex as a catalyst, and to determine the concentration of the solution as follows: Aromatic hydrocarbon is reacted with a stoichiometrically excess amount of alkali metal in the special ethers as a solvent and under a high-vacuum or an inactive gas atmosphere. After removal of unreacted alkali metal by filtration under a high-vacuum or in an inert gas atmosphere, the solution of aromatic hydrocarbon anion-alkali metal cation complex free of atomic alkali metal is prepared. The concentration of the complex solution is determined by the alkylhalogenide-method or by acid titration. The amount of the monomer to be used for the formation of the polymer having the defined degree of polymerization is calculated from the concentration of the complex in the solution. The calculated amount of the monomer is added to the complex solution, or conversely the complex solution is added to the calculated amount of the monomer, to obtain the living polymer having the desired and defined degree of polymerization.

However, the complex solution is extremely sensitive to air, oxygen, carbon dioxide and Lewis acid and its catalytic activity is instantly lost by contacting and reacting therewith. Consequently, it requires strict and careful precautions to prepare and handle the complex solution, and sampling and analysis thereof should be carried out in the absence of water, oxygen, air, carbon dioxide and Lewis acid. However, these procedures could not be carried out substantially under the aforesaid conditions, and the quantity of the complex solution is extremely small compared with the quantity of the monomer so that the air and water absorbed on the sampling and analysis apparatus is a relatively large quantity compared to the quantity of the complex. As a result, a considerable error of analysis can occur. This means the degree of polymerization may be controlled on the basis of an erroneous analysis value and the degree of polymerization of the obtained polymer was usually not as expected.

In addition to the above, in the filtration of the complex solution, fine particles of alkali metal may pass through filters and the filtered complex solution may be contaminated thereby. In that event, some analytical errors of the concentration of the complex solution can occur, and still worse, atomic alkali metal may affect the polymerization and cause unfavorable influences upon controlling the degree of polymerization and/or upon the molecular weight distribution.

In a synthesis of the living polymer from the monomer having a low polarity and a comparatively lower reaction rate of polymerization, such as styrene, butadiene and isoprene, it has been found that when alkali metal is used in a form of fine particles having a mirror-like and large surface area, the living polymer can be synthesized by slow addition of the monomer into the mixture containing considerably less than the stoichiometric quantity of the activator such as aromatic hydrocarbon and diarylketones, a high quantity of alkali metal, and a compound of Lewis-base type. In this initial step, the entire quantity of the used alkali metal is reacted with the monomer by catalytic action of the activator to produce the living polymer, and then, in the propagation stage the numerical average degree of polymerization of the living polymer is shown as a function of the molar ratio of the added monomer to the added alkali metal.

The assumed reaction mechanism may be as follows: when the monomer is added into the mixture, monomeric anion radical is produced by electron-transfer from the complex to the monomer, and at the same time the activator is reproduced and immediately reacted with unreacted alkali metal to form the activator-alkali metal complex, and the rate of formation of the complex and the rate of electron-transfer from the complex to the monomer are greater than the rate of formation of the monomeric anion, so that the entire quantity of the added alkali metal is reacted by catalytic action of the activator to form the same living polymer as produced by known methods.

Consequently, in this novel process, a controlling of the desired and defined degree of polymerization is performed very easily by the preliminarily determined quantities of the monomer and the alkali metal to be used, and it is not necessary to filter, sample and analyze the solution of activator-alkali metal complex.

In this process, no such error in estimation of polymerization degree will occur as in previous known methods, and the degree of polymerization of the produced polymer agrees very closely with the calculated value.

The process of this invention is carried out as follows: To a reaction vessel filled with inert gas, Lewis-base and less than the stoichiometric amount of an activator for alkali metal are added; then alkali metal having a large surface area, such as an alkali metal dispersion is added to produce a solution containing a small quantity of an activator-alkali metal complex and a large quantity of an unreacted alkali metal.

To the mixture, a monomer to produce the living polymer is added gradually under agitation to produce the living polymer. The polymerization procedure should be carried out in substantial absence of air, oxygen, carbon dioxide and Lewis acid.

In this process, Lewis base comprises ethers, acetals, tertiary amines and others employed in the prior known processes as a solvent and illustrated as follows: aliphatic monoethers such as dimethylether and methylethylether; aliphatic polyethers such as 1,2-dimethoxyethane and 2,2'-dimethoxydiethylether; cyclic ethers such as tetrahydrofuran and 1,4-dioxane; acetals such as methylal and 1,1-dimethoxyethane; and tertiary amines such as trimethylamine triethylamine and N-methylmorpholine. The amount of the Lewis-base is more than three parts by weight thereof to one part by weight of alkali metal. However, it is not economical to employ too much, and substantially, it is not necessary to employ more than the quantity which is sufficient to maintain agitation of the reaction mixture. Practically, it may be from equal to or less than the quantity of the monomer, but when the polymerization is carried out at below −40° C. to produce polymer 10,000 or more of molecular weight, from one to three parts (weight) to the monomer is preferably employed.

The activator is illustrated as follows: condensed ring aromatic hydrocarbons such as anthracene, naphthalene and phenanthrene; non-condensed ring aromatic hydrocarbons such as biphenyl and terphenyls; polynuclear aromatic hydrocarbon condensed ring compounds such as binaphthyls and phenylnaphthalene; conjugated unsaturated heterocyclic compounds having a vinyl group on a side chain, such as 4-vinyl pyridine and 2-vinylfuran; and diaryl ketones such as benzophenone and phenylnaphthyl ketone. The quantity of the activator is less than the mole equivalent of alkali metal and practically ranges from 0.1 mole to 0.0001 mole per gram atom of alkali metal.

Lithium, sodium, potassium, rubidium, cesium, their alloys or mixtures and alloys or mixtures of one or more of the aforesaid alkali metals and other metals are included as the alkali metals according to this invention. They are employed in a form having a large surface area, such as fine particles having less than $20\mu$ in average diameter and less than $50\mu$ in maximum diameter or a mirror.

The known dispersion of alkali metal may be successfully used to provide such particles, and the mirror may be obtained by a known method comprising heating of the alkali metal under vacuum.

The monomer to produce the living polymer initially is a compound having the following general formula;

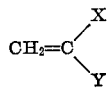

wherein X is selected from the group consisting of hydrogen and organic substituents and Y is an organic substituent, and the sum of Hammett's substituent, constants of X and Y is in a range from −0.2 to 0.1. As non-limiting examples thereof there may be mentioned α-methylstyrene, isoprene, butadiene and styrene. The monomer may also be employed as the monomer to be polymerized and copolymerized.

The employed quantity of alkali metal and the monomer are varied by the optionally defined degree of polymerization. A numerical average degree of polymerization of the polymer is expressed by the following formula;

$$\overline{P}n = K[M]/[C]$$

wherein $\overline{P}n$ is the numerical average degree of polymerization, [M] is moles of used monomer, [C] is moles of alkali metal and K is a positive coefficient in a range from 1 to 2 defined from the polymerization temperature in a range of from −100° C. to 30° C. At −40° C. or below, K is substantially 2, and it becomes less than 2 with elevation of the temperature. At higher than 0° C, it becomes substantially 1. Based on the above facts, it is concluded as follows: At a lower temperature, divalent anion is mainly formed in the initial stage, and then polymeric divalent anion is produced by anionic propagations at both ends of the anion; however, at a higher temperature, monovalent anion is formed mainly in the same stage, and then polymeric monovalent anion is produced by anionic propagation at only one end; furthermore, at higher than 30° C. the chain transfer occurs violently, and then polymer without anionic end, which can be called living polymer is produced.

The addition of the monomer may be carried out in either gaseous or liquid state, but additions of the total amount of the monomer at one time should be avoided. It is particularly necessary for the addition of the monomer to be very slow at the initial stage until the added amount reaches a range of from 1 mole to 5 moles to the added alkali metal. This is for the reason that the total amount of the alkali metal should be consumed completely before the starting of the propagation reaction.

The reaction time of polymerization in the propagation stage is short, the monomer is almost polymerized as soon as it is added. If necessary, the reaction solution is stirred for about one hour after the addition of the entire amount of the monomer. When the monomer is added repeatedly after interruption, the polymerization will soon proceed continuously.

A block copolymer, an alternate block copolymer and a random copolymer may be prepared by addition of another monomer, by further additions of the third and/or the fourth monomer, by alternate additions of two or more kinds of monomer and by addition of a mixture of two or more kinds of monomer to the mixture containing the living polymer.

The other monomers which are able to produce the various copolymers and living copolymers are compounds having the following formula;

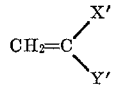

wherein $X'$ is selected from the group consisting of hydrogen and organic substituents, and $Y'$ is an organic substituent, and the sum of Hammett's substituent constants of $X'$ and $Y'$ is in a range from $-0.2$ to $0.7$. As non-limiting examples thereof, methoxylstyrene, methylmethacrylate, ethylmethacrylate, methylacrylate, ethylacrylate, and methacrylonitril are mentioned in addition to the previously mentioned examples of the monomer to produce the living polymer initially.

In order to terminate the polymerization, a larger than stoichiometric quantity of a termination reagent such as water, alcohol and Lewis acid and mixtures thereof is added to the reaction mixture, whereby hydrogen atoms are introduced at the ends of the polymeric chain of the living polymer and activation of the living polymer is eradicated. When a known electrophilic reagent capable of introduction of a functional group to an anionic end of the living polymer, such as carbon dioxide, oxygen, formaldehyde, ethylene oxide, propylene oxide and carbon disulfide, is employed as the termination reagent, functional groups such as a carboxyl group, hydroxy group, methylol group, 2-hydroxyethyl group, 2-hydroxypropyl group and dithiocarboxyl group may be introduced to an end or ends of the polymeric chain. In this case, difunctional polymer, monofunctional polymer and the mixed polymers thereof are obtained at the polymerization reaction of a range of $-40°$ C. or below, $0°$C. to $30°$ C. and $-40°$ C. to $0°$ C. respectively.

After the termination of the polymerization, the mixture is subjected to distillation to remove Lewis-base and the excess of added reagents.

Thus, the various kinds of polymer are obtained after separation and purification comprising precipitation, filtration, washing and other preferred procedures.

The polymer obtained by this process has the extremely narrow-distribution of molecular weight, and the ratio weight of average molecular weight to numerical average molecular weight is in a range from 1.0 to 1.2.

The following non-limiting examples illustrate this invention as follows:

Example I

To a 1-litre flask fitted with an air-tight agitator, a reflux condenser, a gas inlet, an inlet for adding reagents and a thermometer, 400 g. of tetrahydrofuran and 0.04 g. of o-terphenyl (0.17 millimole) was added to dissolution. The air in the flask was replaced by nitrogen gas. Then 0.23 g. (0.01 mole) of sodium dispersion having an average particle size of $8\mu$ and a maximum particle size of $25\mu$, which was produced from 1 part (weight) of sodium and 1 part (weight) of kerosene, was added to the solution to obtain the deeply reddish-brown colored mixture containing sodium complex of o-terphenyl and a large excess amount of sodium dispersion.

Under cooling at $-70°$ C. and vigorous agitation, 226 g. (4.2 mole) of butadiene was introduced to the mixture for 4 hours at a uniform rate. The reaction mixture was agitated for 1 hour to obtain the reddish and viscous polymerization mixture. 2 ml. of methanol was added to the mixture to terminate polymerization, resulting in the mixture becoming colorless.

The mixture was heated to room temperature, and 200 ml. of water was added, under agitation and introduction of nitrogen gas and then the mixture was allowed to stand for 30 minutes.

The under layer of sodium hydroxide solution was separated, and tetrahydrofuran and methanol in the upper layer were recovered by distillation under a reduced pressure. To the residual viscous product, 200 ml. methanol was added and the mixture was heated under agitation for washing.

After decantation and drying under a reduced pressure, 222 g. of highly viscous and colorless polybutadiene was obtained. The yield was 98.3%, and the intrinsic viscosity $[\eta]$ in toluene at $30°$ C. was 0.408.

The numerical average molecular weight was calculated from the intrinsic viscosity by the following equation;

$$[\eta] = 1.0 \times 10^{-4} M^{0.77}$$

wherein $M$ is the numerical average molecular weight of polybutadiene (Reference: M. Szwarc, Journal of Polymer Science, vol. 25, page 221 (1957)), and it was 48,890. The number average molecular weight from the ratio of the molar concentration of the added monomer to the added alkali metal was calculated by the following equation and it was 45,400.

The numerical average polymerization degree=2[butadiene]/[sodium].

Both numerical average molecular weights calculated by different methods agreed within a limit of allowable error in measurement.

Subsequently, the polymer was fractionated in 9 fractions, by addition of methanol to the solution of polymer in benzene and the intrinsic viscosities of all fractions were measured to determine the distribution of molecular weight.

The result is shown in the following table:

| No. of Fraction: | Percent | Intrinsic Viscosity | Molecular Weight |
|---|---|---|---|
| 1 | 5.7 | 0.554 | 72,730 |
| 2 | 16.1 | 0.524 | 67,660 |
| 3 | 30.2 | 0.456 | 56,480 |
| 4 | 19.3 | 0.382 | 44,880 |
| 5 | 6.6 | 0.354 | 40,650 |
| 6 | 4.7 | 0.325 | 36,390 |
| 7 | 5.7 | 0.256 | 26,680 |
| 8 | 7.1 | 0.248 | 25,610 |
| 9 | 4.6 | 0.157 | 14,150 |

It was shown that the distribution of the molecular weight was very narrow and the ratio of average molecular weight to numerical average molecular weight was 1.17.

Example II

To the polymerization mixture obtained by the same procedure as in Example I, 0.5 g. of ethylene oxide was added under agitation at $-70°$ C., whereby the mixture changed to a reddish gel.

After the same treatment as Example I, 221.4 g. of extremely viscous and slightly yellowish polybutadiene glycol was obtained. The intrinsic viscosity $[\eta]$ in toluene at $30°$ C. was 0.409. The infrared absorption spectrum indicated existence of primary hydroxyl group. The hydroxyl value by the pyridine-acetic anhydride method was 2.4 which agrees approximately to the calculated value of 2.47.

Example III 208 g. of polybutadiene was obtained by proceeding similarly to Example I with the exception of the following conditions: the polymerization temperature was $0°$ C. and the termination of polymerization was carried out by the addition of 2 moles of water. The yield was 92.0%. The intrinsic viscosity $[\eta]$ in toluene at $30°$ C. was 0.255. The numerical average molecular weight calculated from $[\eta]$ was 26,550, and that from the ratio of molecular concentration of the added monomer to the added alkali metal was 22,700.

Example IV

To the polymerization mixture obtained by the same procedure as Example III, a large excess amount of powdered solid carbon dioxide were added under agitation.

The mixture was permitted to stand until it reached room temperature and the excess of carbon dioxide was evaporated, and then hydrochloric acid was added to the mixture until slightly acid. 210.5 g. of viscous and colorless polybutadiene carboxylic acid was obtained, after the same treatment as in Example I.

The intrinsic viscosity $[\eta]$ in toluene at 30° C. was 0.260, from which the numerical average molecular weight was calculated as 27,230.

The neutralization value measured as 2.1 which agreed approximately with the 2.47 calculated value.

Example V

In a 300 ml. flask fitted with an air-tight agitator, a reflux condenser, a gas inlet, a reactant inlet and a thermometer, 50 g. of 1,2-dimethoxyethane and 0.13 g. (0.001 mole) of naphthalene were charged and dissolved to form a solution. After replacement by nitrogen gas, 0.69 g. (0.1 mole) of lithium as 30% lithium dispersion having an average particle size of 6μ and a maximum particle size of 15μ, which was prepared by dropwise addition of lithium solution of liquid ammonia to toluene, was added into the solution. A green mixture was obtained.

To the mixture, 54.5 g. (0.8 mole) of isoprene was dropped at uniform rate for 4 hours under cooling at −50° C. and vigorous agitation. After that, a mixture of 7 g. of glacial acetic acid and 30 g. 1,2-dimethoxyethane was added to the yellow polymerization mixture to terminate polymerization. 100 g. of water was added to the mixture and vigorous agitation was continued. After being permitted to stand, the water layer was removed, and then the solvent and the excess acetic acid were removed by distillation. To the residual organic layer, 200 ml. of methanol were added under agitation. After washing, the mixture was allowed to stand and methanol separated from the mixture was removed by decantation and the residue was dried under a reduced pressure. 54.0 g. of colorless and viscous polyisoprene was obtained.

According to the vapour pressure osmometric method the numerical average molecular weight was determined as 1,120. It was found that isoprene oligomer did not exist in the methanol layer, consequently it was proved that the polymer had a narrow distribution of molecular weight.

Example VI

To the polymerization mixture obtained by the same procedure as in Example V, 41.6 g. (0.4 mole) of styrene was added dropwise under agitating at −50° C. for 2 hours. The mixture was changed to a reddish color.

Then, the polymerization reaction was terminated by the same procedure as in Example VII.

94.3 g. colorless and highly viscous polymer was obtained from the mixture, after removing water, solvent and acetic acid and washing with methanol and drying at reduced pressure.

According to the vapour pressure osmometric method the numerical average molecular weight was determined as 2,010. From the infrared absorption spectrum, it was found that 43.1% of polystyrene chain was included in the polymeric chain.

By addition of isooctane to the toluene solution of the polymer, no precipitate was formed. This is a proof that homopolymer of styrene did not exist in the polymer.

Furthermore, the polymer could not be extracted by isooctane at all. This is proof that homopolymer of isoprene did not exist in the polymer.

From a consideration of the above results, it was clear that the polymer is the block copolymer of isoprene and styrene.

Example VII

In a 2-liter reaction vessel fitted with an air-tight agitator, a reflux condenser, a gas inlet, a reactant inlet and a thermomoter, 100 g. of dioxane and 0.15 g. (0.001 mole) of biphenyl were charged to be dissolved. The air in the reactor was replaced by nitrogen gas and then, 0.23 g. (0.01 mole) of sodium was added as dispersion having an average particle size of 10μ and a maximum particle size of 30μ which was prepared by the dispersion of sodium in an equal amount of kerosene. To the deeply blue reaction mixture, under vigorous agitation, a mixture of 1,040 g. (10 mole) of styrene and 1,000 g. of dioxane was added dropwise during 6 hours.

The numerical average molecular weight of the final product was calculated from $(\eta)$ by the following equation:

$$(\eta) = 1.6 \times 10^{-4} M^{0.74}$$

wherein M is numerical average molecular weight of polystyrene (Reference; M. Szwarc, et al., J. Am. Chem. Soc. vol. 79. Page 2026 (1957)), and it was 110,000.

On the other hand, the weight average molecular weight by the osmometric pressure method was 131,000. The ratio of weight average molecular weight to numerical average molecular weight was 1.19. This is proof that the polymer has a narrow distribution of molecular weight.

Example VIII 0.4 g. (0.0102 mole) of potassium mirror was fixed by vacuum evaporation on the wall of a reactor which was fitted with an air-tight agitator, a reflux condenser, a gas inlet, a reactant inlet and a thermometer. After nitrogen gas was introduced into the reactor, 35.0 g. of tetrahydrofuran and 0.1 g. (0.55 millimole) of benzophenone were charged to prepare the deeply blue mixture.

Under vigorous agitation at −20° C., the mixture of 20.8 g. (0.2 mole) of styrene and 16.2 g. (0.3 mole) of butadiene were dropped into the reaction mixture during 4 hours, and then the reddish polymerizing mixture was obtained. To the mixture, considerable excess of powdered solid carbon dioxide was added. After the mixture was allowed to stand at room temperature and the excess carbon dioxide was evaporated from it, hydrochloric acid was added until slightly acid.

After the same treatment as in Example I, 35.6 g. of the viscous and semi-solid polymer product was obtained. The numerical average molecular weight according to the vapor pressure osmometric method was 5,820, and the neutralization value was 14.0.

Infrared absorption spectrum indicated that the polymer contained 56.0% by weight of styrene.

By addition of isooctane to the solution of the polymer in toluene, precipitation did not at all occur and there was no extract upon isooctane extraction. Those are proofs that the polymer is the mixture of monocarboxylic acid and dicarboxylic acid of styrene-butadiene copolymer.

What we claim is:

1. A process for preparing living polymers which comprises in an inert atmosphere reacting at least one monomer of the formula

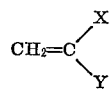

wherein X is hydrogen or methyl and Y is vinyl or phenyl, with a mixture of alkali metal in the form of a mirror or of small particles having an average diameter of less than about 20μ and a maximum diameter of up to about 50μ, an activator in an amount of 0.001 to 0.1 mole per gram-atom of said alkali metal and a Lewis type base in an amount by weight of more than three times the weight of the alkali metal, said activator being in the form of a complex with said alkali metal, at a temperature in the range of from −100° C. to 30° C., the reaction being so conducted that in an initiation stage the addition of monomer to said mixture until the proportion of monomer added per gram-atom of the alkali metal is from 1 to 5 moles is performed sufficiently slowly that the alkali metal is completely consumed whereby the propagation reaction of the living polymer chain is minimized, said activator being selected from the group consisting of condensed ring aromatic hydrocarbons, polynuclear aromatic hydrocarbons having bonded non-condensed rings, polynuclear aromatic hydrocarbon having bonded condensed ring, 4-vinyl pyridine, 2-vinylfuran, benzophenone and phenylnaphthyl ketones, said Lewis type base being selected from the group consisting of dimethylether, methylethylether, 1,2 - dimethoxyethane, 2,2′-dimethoxydiethylether, tetrahydrofuran, 1,4-dioxane, methylal, 1,1-dimethoxyethane, trimethylamine, triethylamine and N-methylmorpholine.

2. The method of production of living polymer according to claim 1 which comprises adding to the reaction mixture at least one monomer of the formula

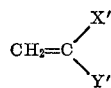

wherein X′ is hydrogen or methyl and Y′ is vinyl, phenyl, carboxymethyl, carboxyethyl or nitrile.

3. The method according to claim 1 which comprises adding to the reaction mixture a termination agent stoichiometrically in excess and selected from the group consisting of water, alcohol, acetic acid and mixtures thereof, thereby terminating the reaction and forming the polymer.

4. The method according to claim 3 wherein the termination agent introduces a functional group selected from the group consisting of carboxyl, hydroxyl, methylol, 2-hydroxyethyl, and dithiocarboxyl, by adding to the reaction mixture a member of the group consisting of carbon dioxide, oxygen, formaldehyde, ethylene oxide, propylene oxide and carbondisulfide.

5. The method of producing a copolymer from the living polymer according to claim 2 which comprises adding to the reaction mixture an amount stoichiometrically in excess of a termination agent selected from the group consisting of water, alcohol, acetic acid and mixtures thereof, thereby terminating the reaction and forming the copolymer.

6. The method according to claim 5 wherein the termination agent introduces a functional group selected from the group consisting of carboxyl, hydroxyl, methylol, 2-hydroxyethyl, and dithiocarboxyl, by adding to the reaction mixture a member of the group consisting of carbon dioxide, oxygen, formaldehyde, ethylene oxide, propylene oxide and carbondisulfide.

7. The method according to claim 1 in which said activator is selected from the group consisting of naphthalene, anthracene, phenanthrene, biphenyl, terphenyls, binaphthyls, phenylnaphthalenes, 4-vinyl-pyridine, 2-vinylfuran, benzophenone and phenylnaphthyl ketone.

8. The method according to claim 1 wherein the reaction is carried out at a temperature of from about −100° C. to about −40° C.

9. The method according to claim 1 wherein the reaction is carried out at a temperature of from about −40° C. to about 0° C.

10. The method according to claim 1 wherein said reaction is carried out at a temperature of from about 0° C. to about 30° C.

11. The method according to claim 2 wherein the addition of said first monomer and of said other monomer is carried out alternately.

12. The method according to claim 2 wherein at least two different kinds of other monomers are added.

References Cited

UNITED STATES PATENTS

| 2,146,447 | 2/1939 | Scott. | |
| 3,135,716 | 6/1964 | Uraneck et al. | 260—880 |
| 3,157,604 | 11/1964 | Strobel. | |
| 3,317,918 | 5/1967 | Foster. | |
| 3,330,785 | 7/1967 | Boyd. | |
| 3,346,666 | 10/1967 | Dennis | 260—879 |

FOREIGN PATENTS

| 658,644 | 2/1963 | Canada. |

OTHER REFERENCES

Ziegler et al., Annalen der Chemie (Justus Liebig) vol. 511, Apr. 12, 1934, XII, pp. 45–63, pp. 49–51, specifically relied upon.

JOSEPH L. SCHOFER, Primary Examiner

WILLIAM HAMROCK, Assistant Examiner

U.S. Cl. X.R.

260—47, 80.7, 80.81, 82.3, 83.5, 85.1, 86.7, 88.2, 88.7, 89.5, 93.5, 94.2, 94.7, 880, 881, 885